(12) United States Patent
Verde Preckler et al.

(10) Patent No.: US 7,967,243 B2
(45) Date of Patent: Jun. 28, 2011

(54) OPTIMIZED CONFIGURATION OF ENGINES FOR AIRCRAFT

(75) Inventors: Jorge Pablo Verde Preckler, Madrid (ES); José Miguel Vizarro Toribio, Madrid (ES); Raúl Carlos Llamas Sandin, Madrid (ES); Stephane Viala, Mamers (FR)

(73) Assignee: Airbus Espana, S.L., Madrid (ES)

( * ) Notice: Subject to any disclaimer, the term of this patent is extended or adjusted under 35 U.S.C. 154(b) by 613 days.

(21) Appl. No.: 12/070,911

(22) Filed: Feb. 21, 2008

(65) Prior Publication Data
US 2009/0159741 A1 Jun. 25, 2009

(30) Foreign Application Priority Data
Dec. 21, 2007 (ES) .................................. 200703399

(51) Int. Cl.
*B64C 15/12* (2006.01)
(52) U.S. Cl. ......................................... 244/56; 244/75.1
(58) Field of Classification Search .................. 244/7 C, 244/12.4, 48, 54–56, 87, 75.1
See application file for complete search history.

(56) References Cited

U.S. PATENT DOCUMENTS

| | | | | |
|---|---|---|---|---|
| 1,726,062 A * | 8/1929 | Gilman | ............................ | 244/48 |
| 1,871,538 A * | 8/1932 | Mathias | ........................ | 244/7 C |
| 2,257,940 A * | 10/1941 | Dornier | ........................... | 244/56 |
| 2,969,935 A * | 1/1961 | Price | .............................. | 244/7 C |
| 3,109,614 A * | 11/1963 | Steidl | ............................... | 244/87 |
| 3,756,529 A * | 9/1973 | Backlund et al. | ............... | 244/87 |
| 3,995,794 A * | 12/1976 | Lanier | .......................... | 244/12.4 |
| 4,034,939 A * | 7/1977 | Ridley et al. | ..................... | 244/87 |
| 4,149,688 A * | 4/1979 | Miller, Jr. | ..................... | 244/12.4 |
| 4,966,338 A * | 10/1990 | Gordon | ........................... | 244/54 |
| 4,982,914 A * | 1/1991 | Eickmann | ...................... | 244/56 |
| 5,020,740 A * | 6/1991 | Thomas | .......................... | 244/54 |
| 5,957,405 A * | 9/1999 | Williams | ........................ | 244/55 |
| 6,138,943 A * | 10/2000 | Huang | .......................... | 244/7 C |
| 2009/0072079 A1* | 3/2009 | Hawley | ............................ | 244/54 |

FOREIGN PATENT DOCUMENTS

| FR | 2647414 | * 11/1990 | ...................... 244/56 |
|---|---|---|---|
| GB | 2025864 A | * 1/1980 | ...................... 244/56 |

* cited by examiner

*Primary Examiner* — Galen Barefoot
(74) *Attorney, Agent, or Firm* — Ladas & Parry LLP

(57) ABSTRACT

The invention relates to a configuration of engines (3) for aircraft located in the rear part of the fuselage (2) of said aircraft, the engines (3) being attached in a fixed manner by pylons (5) to the structure of the aircraft, said structure comprising a torsion box (14) which traverses the fuselage (2) and is used to attach the pylons (5), the fuselage (2) comprising an opening (4) allowing the passage of the suspension pylons (5) for the engines (3), said configuration further comprising a pivoting area (8), an actuator (7) and a fitting (6) through which the actuator (7) is attached to the suspension pylons (5) and to the torsion box (14) of the aircraft, such that the assembly formed by the actuator (7) and the fitting (6) allow balancing the pylon (5) and engine (3) assembly of the aircraft through the pivoting area (8), thus achieving controllable and optimal thrust vectoring of the aircraft for each flight phase.

7 Claims, 3 Drawing Sheets

OPTIMIZED CONFIGURATION OF ENGINES FOR AIRCRAFT

FIELD OF THE INVENTION

The present invention relates to a configuration of propulsion engines for large civilian aircraft, and more particularly for aircraft incorporating a configuration of engines attached to the rear fuselage, which allows optimizing the engines in several flight situations, mainly during takeoff and cruising.

BACKGROUND OF THE INVENTION

The benefits of having engines generating thrust vectoring or vectored thrust are well known. In recent years systems which allow obtaining and controlling the thrust vector of engines have been developed on the basis of essentially two actuation types: either through selectively diverting the engine exhaust gases and/or the air from the bypass fan by means of directional mechanical elements within the nozzles (see for example ES2010586), or through the variable exhaust gas area without modifying the thrust vector angle of the engines. All these mechanisms to a greater or lesser extent add complexity both to the configuration of the nozzles and to the control systems thereof, which leads to rejecting their use in many of the new aircraft models given that the ratio between the benefits of using them and the associated problems and expenses involved with the fact that they are located in an element that is as complex and of vital security in an aircraft, such as its propulsion systems, is not positive.

As described in document U.S. Pat. No. 6,938,408 B2, thrust vectoring technology has obtained very satisfactory results in military aeronautics, from the use demonstrated in military airplanes for low speed flight conditions or with high angles of attack, as well as its testing at high altitudes and mid-high speeds for the purpose of reducing the drag in cruise flight. Defining the stability of an airplane as the forces and moments generated in order to recover the equilibrium position when it is out of said position, the greater the stability of an aircraft, the less the maneuverability thereof, i.e. the less the capacity of the control surfaces to take the apparatus out of equilibrium, will be less. It is for this reason that systems adding controllability to the airplane, such as the vectored thrust of the engines, have been used above all in military aviation in which its applicability has no room for doubts given its configuration in which maneuverability or controllability of the aircraft is top priority. However this same system, as occurs with the rest of the aerodynamic and control surfaces of the airplane, which can contribute to the aircraft diverting from its equilibrium point, can be applied in an identical manner to the opposite fact, i.e. it can contribute to the static and dynamic longitudinal stability of the aircraft.

The use of thrust vectoring systems in commercial aviation is also understood from the aircraft energy efficiency point of view. It is known that in order for an aircraft to have longitudinal stability its center of gravity (CG) must be at a certain distance for each flight condition with respect to the aerodynamic center of pressure (CP). Airplanes are designed such that the diving moment, caused by the fact that the CG is located in front of the CP, is counteracted with the moment caused by the horizontal tail stabilizer. If it is possible to contribute to the stability of the aircraft through being able to guide the exhaust gases, airplanes can be designed in which the area of the tail assembly is less and works with smaller angles of attack, therefore creating less aerodynamic drag. Reducing the aerodynamic drag and the structural weight implies less propulsion energy waste and consequently improved energy efficiency.

Several studies carried out emphasize the improvement in all flight conditions by optimizing the thrust vector angle. One of the main considerations when designing an airplane is the tilt angle of the engines with respect to the horizontal of the fuselage. Optimal tilt depends on the features of the airplane as well as on the flight conditions. From the point of view of the effects occurring on the wing, a positive thrust angle contributes to reducing the lift requirements of the wing, although it implies a slight reduction in the horizontal thrust component. The initiative for developing a variable thrust system makes sense with the fact that in each flight condition the optimal thrust angle varies. The controllability of this variable in flight aids in reducing the speed and the distance during takeoff, in reaching a higher altitude with the same propulsion level in the climb phase, minimum propulsion in cruise conditions, a better gliding range in the descent and reducing the final approach speed and consequently the landing distance.

The benefits of using thrust vectoring are likewise described in documents known in the art seeking a viable solution for use, which contrasts with its subsequent applicability in real aircraft designs. The purpose of the present invention is not only to develop a system providing thrust vectoring in the aircraft, but that the system can also be applied. The main problem considered by the patented systems until now is the complexity added by their use in flight. Thus, the large number of moving elements which these systems provide to the nozzles of the engines means that their use entails an excessive maintenance expense to ensure proper operation of the system. Other known systems add great complexity to the flight control systems, which means that the time used in their optimal operational capacity does not result in the improvement of the overall behavior of the aircraft in which they intend to influence, but they are not determining factors of said behavior.

The present invention offers a solution to the previously mentioned problems.

SUMMARY OF THE INVENTION

The present invention thus relates to a system providing tilting in propulsion engines for large civilian aircraft, and more particularly a system which can be used in those aircraft incorporating a configuration of engines attached to the rear fuselage. The use of this invention allows optimizing the actions during takeoff, climb, cruising and landing, while at the same time improving in-flight safety and reducing the minimum takeoff and landing speed.

The invention develops a system which does not affect the design of the engines and is based on the system developed and used in all commercial aircraft currently under construction, i.e. it provides a solution similar to the trimming or balancing of the horizontal tail stabilizer both in configuration and in control, which assures its viability.

The invention is particularly aimed at an airplane design in which its relative benefit is greater, i.e. an aircraft configuration the engines of which are located in the rear part of the fuselage. Varying the position of the engines involves moving the pylons since they are structures inherently attached to the airplane. The pitching moment achieved with the directionality of the exhaust gases is increased with the lift caused by the pylons. The sum of these two effects is relatively greater for an aircraft configuration with engines located in the rear area of the fuselage since they are further from the center of gravity than if they were attached to the wing assembly for example. The tail assembly weight reduction is thus relatively greater as a result of the effect caused by thrust vectoring, which contributes to improved energy efficiency.

The objective of this invention is to assemble the engines of the aircraft in the rear part of the fuselage with a device which allows varying the angle of incidence of the pylons and consequently the thrust vectoring of the engines. This variation allows causing a pitching moment in the aircraft. Having an additional control in order to generate a pitching moment allows optimizing the engine in several flight conditions, mainly during takeoff and cruising. The maximum power necessary for the engines can thus be reduced, reducing their weight, and due to this weight reduction, the weight of the pylons and of the rear fuselage can be reduced. The tailplane is additionally used to cause a pitching moment such that its size can be reduced since it has a variable thrust propulsion system. These reductions entail improved energy efficiency of the aircraft.

The invention is not aimed at the operating mechanism of the pylon trimming or balancing system, but rather at providing a trimming or balancing of such pylons for an assembly configuration in the rear part of the fuselage, therefore achieving controllable and optimal thrust vectoring for each flight phase without modifying the inner structure of the engines. Neither is it aimed at a mechanism for engines for diverting the gases of the engine, but rather it uses conventional engines in which the exhaust component is unique and horizontal.

Other features and advantages of the present invention will be inferred from the following detailed description of an illustrative embodiment of its object in relation to the attached figures.

DETAILED DESCRIPTION OF THE INVENTION

Figure 1:
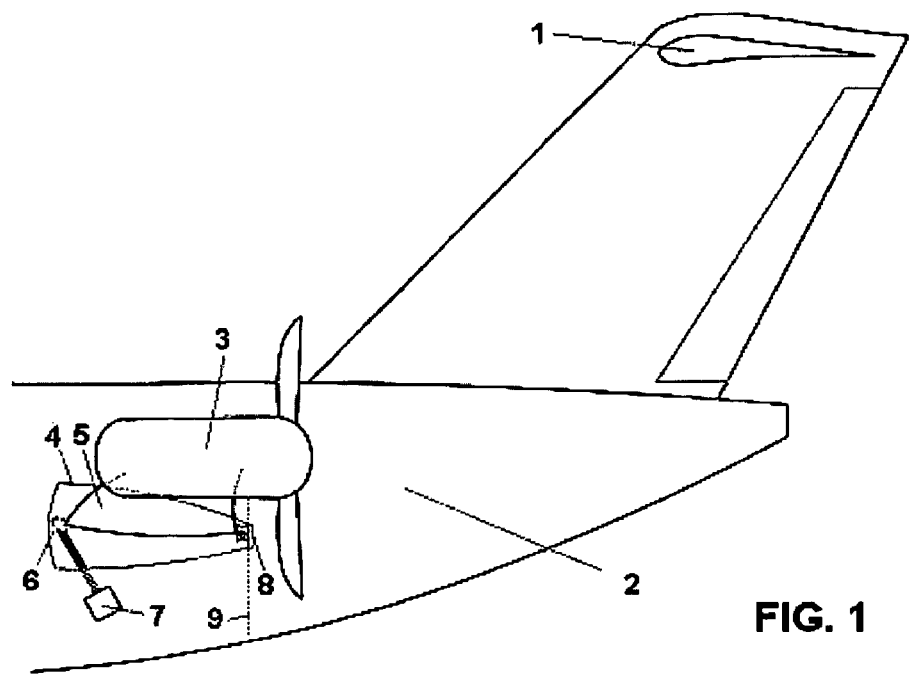
FIG. 1 shows a schematic profile view of an aircraft with an optimized configuration of engines according to the present invention.
Figure 4:
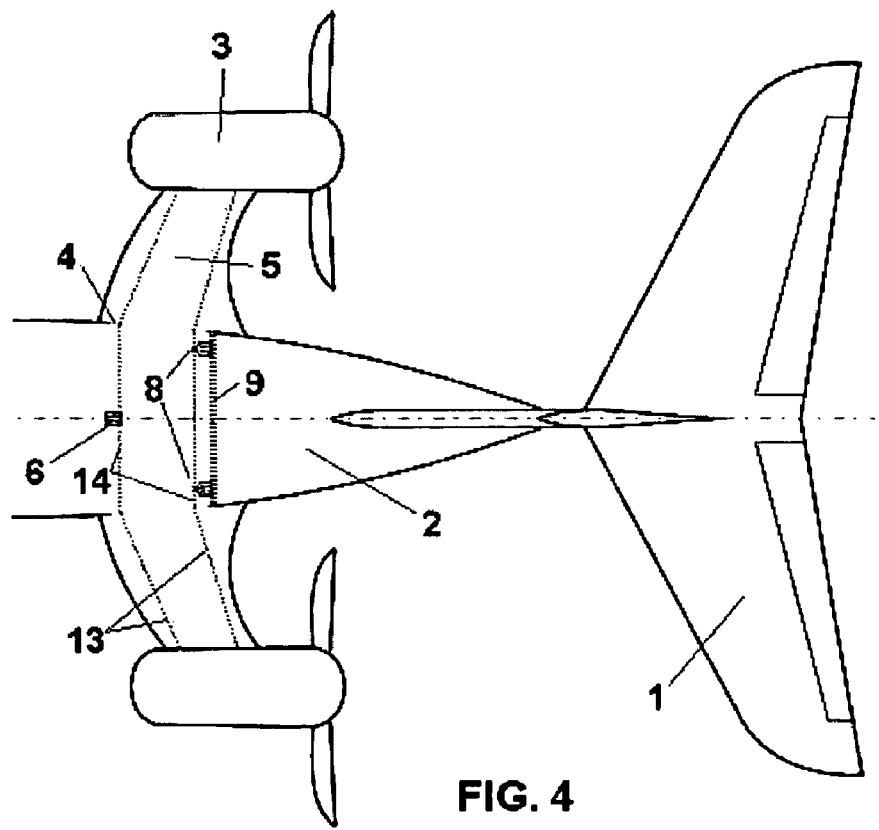
FIG. 4 shows a schematic plan view of an aircraft with an optimized configuration of engines according to the present invention.

As observed in FIGS. 1 and 4, which correspond to the profile and plan views of an aircraft with an optimized configuration of engines according to the present invention, the objective of the invention is to provide a system which allows varying the angle of incidence of the pylon-propulsion group assembly of the aircraft for configurations of airplanes with engines located in the rear part of the fuselage 2. This variation in the angle for expelling the exhaust gases in the nozzles of the engines 3 will allow guiding the thrust such that it is able to act on the aircraft providing pitching moments suitable for each flight phase.

FIG. 1 shows a schematic profile view of an aircraft with an optimized configuration of engines according to the invention, comprising a horizontal stabilizer 1, engines 3 located in the rear part of the fuselage 2 and an opening 4 in the fuselage allowing the passage of the suspension pylons 5 for the engines. This figure likewise depicts the fittings of the pivoting area 8, hooked to the frame 9 of the rear fuselage and the fitting 6 for attaching an actuator 7, preferably a worm gear actuator 7. The assembly formed by the fitting 6 and the worm gear 7 allows balancing the pylon-propulsion group assembly of the aircraft through the pivoting area 8.

Figure 2:
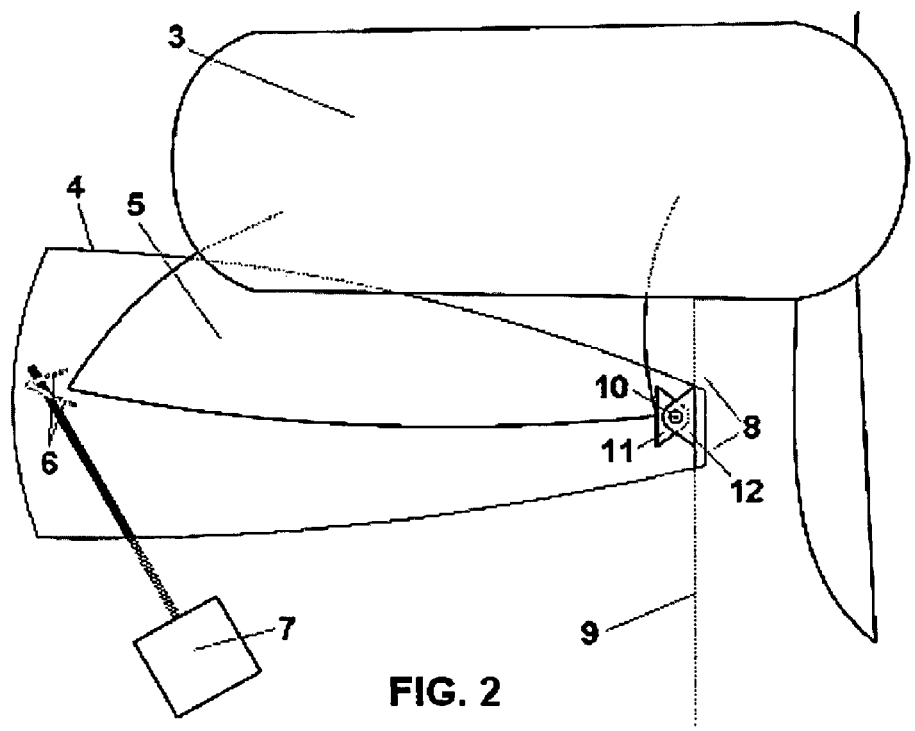
FIG. 2 shows a schematic view of an enlargement of FIG. 1 around the opening of the fuselage of the aircraft with an optimized configuration of engines according to the present invention.

FIG. 2 shows a schematic view of an enlargement of FIG. 1 around the opening 4 of the fuselage of an aircraft with an optimized configuration of engines according to the invention. In said figure it can be observed with detail that the pivoting area 8 is formed by the fitting 11 attached to the engine pylon assembly and by the fitting 12 attached to the frame 9 of the rear fuselage. Attaching the fittings 11 and 12 gives rise to the pivoting shaft 10. Additionally, the worm gear actuator 7 and its coupling to the pylon assembly through the fitting 6 is better observed. In other words, the trimming of the pylon-propulsion group assembly is achieved by acting on the worm gear 7, thereby achieving the desired thrust vectoring. The movement induced in the aircraft pylon on its foremost side as a result of the action of the worm gear 7, is absorbed by the rearmost side of the pylon as a result of the degree of freedom provided by the pivoting shaft 10. Since the pivoting shaft 10 is perpendicular to the vertical plane of the aircraft, it is assured that the balancing of the pylon-propulsion group assembly and consequently the thrust vectoring component of the engines with respect to the longitudinal axis of the aircraft, are always maintained within planes parallel to the vertical plane.

Figure 3:
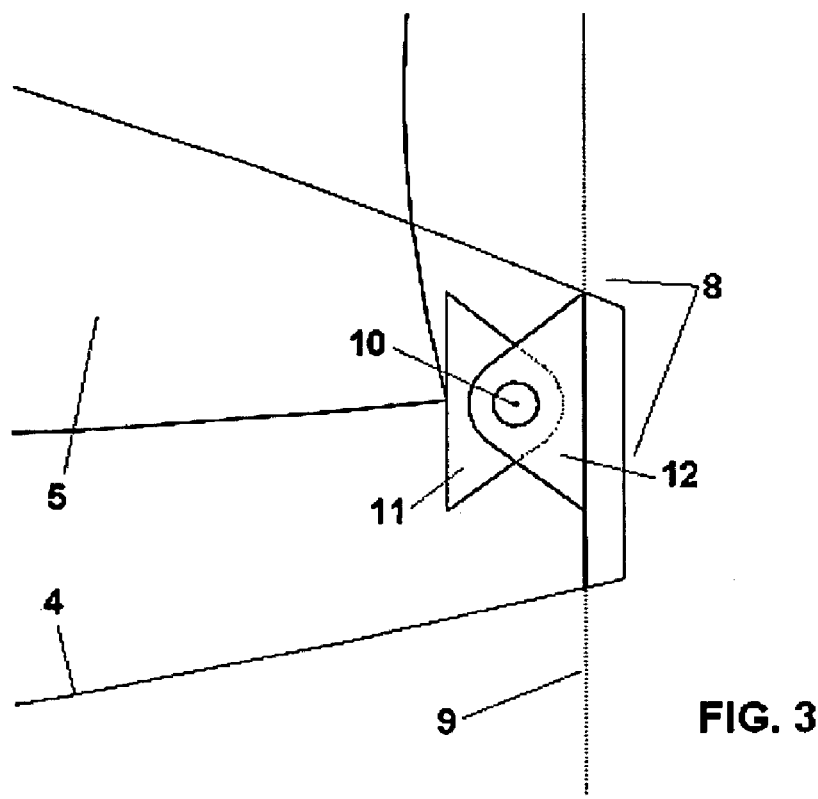
FIG. 3 shows a schematic view of an enlargement of FIG. 2 around the pivoting area of the aircraft with an optimized configuration of engines according to the present invention.

FIG. 3 shows a schematic view of an enlargement of FIG. 2 around the pivoting area 8 of an aircraft with an optimized configuration of engines according to the invention. The configuration of the elements forming it, i.e. the fitting 11 and its attachment to the pylon 5 assembly and the fitting 12 with its attachment to the frame 9 of the rear fuselage, as well as the attachment between both giving rise to the pivoting shaft 10, can be seen in greater detail.

FIG. 4 shows a schematic plan view of an aircraft with an optimized configuration of engines according to the invention, comprising a horizontal stabilizer 1, engines 3 located in the rear part of the fuselage 2 and an opening 4 in the fuselage allowing the passage of the suspension pylons 5 for the engines. The stringers 13 of the pylon and the central or torsion box 14 which traverses the fuselage 2 and is used to attach the pylons 5 are also depicted. The fittings of the pivoting area 8, which are attached to the frame 9 of the rear fuselage 2, and the fitting 6 for attaching the worm gear actuator are likewise depicted.

With the explanation of the previous figures and the plan view of the aircraft of FIG. 4, it can be observed how it is assured that the thrust vectoring has the same directionality in both engines 3. Said feature results in improving the controllability of the balancing system proposed in the invention with respect to the known prior art. The fact that the worm gear is on the perpendicular of the longitudinal axis of the aircraft and the central or torsion box 14 in the horizontal plane or in a plane parallel thereto attached to the frame 9 through the symmetrical fittings giving rise to the pivoting area 8, assures that the thrust component is angularly diverted within planes parallel to the vertical of the aircraft.

Figure 5:
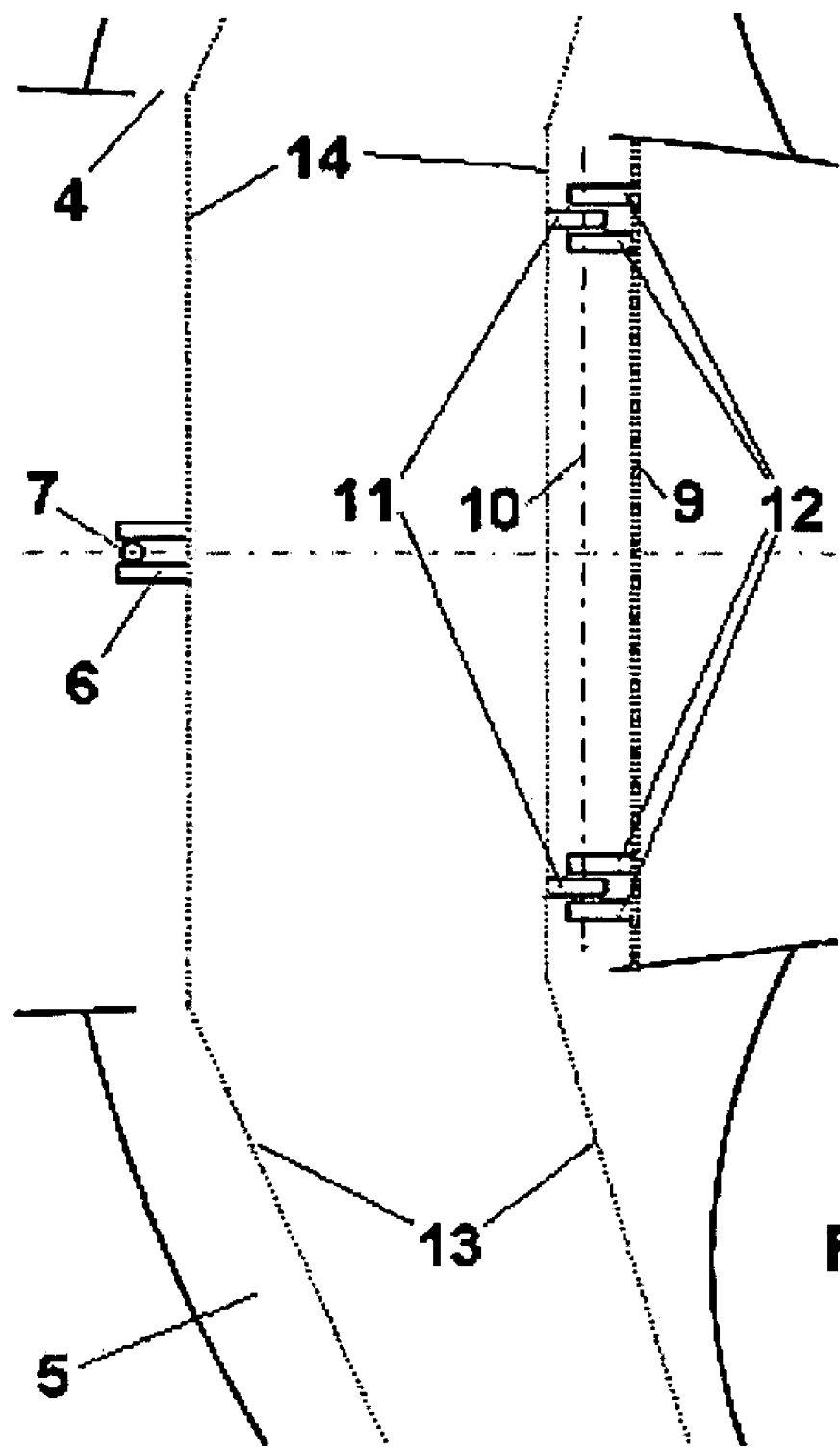
FIG. 5 shows a schematic view of an enlargement of FIG. 4 around the central box of an aircraft with an optimized configuration of engines according to the present invention.

FIG. 5 shows a schematic view of an enlargement of FIG. 4 around the central or torsion box 14. The worm gear actuator 7 and its attachment to the assembly formed by the pylons 5 and the central or torsion box 14 through the fitting 6 is depicted in this figure. The frame 9 of the fuselage to which the fittings 12 are attached, and the fittings 11 for attaching to the central or torsion box 14 as well as the pivoting shaft 10 can also be observed.

As can be observed in FIG. 4 and with more detail in FIG. 5, the pylons 5 of the aircraft, which have a fixed attachment to the engines 3, are equally attached to one another through the structure formed by its frames 13 and the torsion box 14. Therefore all these elements together form a rigid solid. Balancing this rigid solid provides a thrust vectoring with an angular movement with respect to the longitudinal axis of the airplane without the movement of its axis of rotation leaving the vertical plane of the aircraft at any time. This movement is achieved through a pivoting area 8 which is formed by the symmetrical fittings 11 attached in a fixed manner to the torsion box 14 and by the symmetrical fittings 12 attached in a fixed manner to the frame 9 and the coupling of which gives rise to the pivoting shaft 10 orthogonal to the longitudinal axis of the airplane and within a plane parallel to the horizontal, and the fitting 6 used for coupling the torsion box 14 and the worm gear 7. The aircraft control systems for each flight phase will provide the suitable thrust angle through the actuation of the worm gear 7, which, through the fitting 6, will vary the position of the rigid solid formed by pylons and engines upon pivoting about the shaft 10. Since the assembly formed by the pylons and the propulsion groups behaves as a single structure pivoting with the features detailed about the shaft 10, it is assured that the thrust vector of the engines is identical and controllable. The inner structure of conventional civilian aircraft engines currently on the market will not be affected in this process and a widely tested balancing system in the tail assembly will be used.

As has been previously explained, the combined effect of the pylons 5 and the ability to guide the exhaust gases of the engines 3 will give rise to a pitching moment either by behaving as an aerodynamic control surface in the first case, or by causing a thrust in the second case, which will have a very positive impact when designing a smaller and therefore lighter horizontal stabilizer 1. For an aircraft with a rear type fuselage 2 incorporating the assembly formed by the pylons 5 and the engines 3, the difference between whether or not to incorporate the proposed balancing system will be the possibility of reducing the size of the pylons and the engines as a result of optimizing position and therefore effect thereof on each flight phase, such that the aerodynamic surface required in the suspension pylons is less and the propulsion power of the engines is reduced. The improved energy efficiency for a lighter structure and for engines with less thrust requirements is obvious.

The modifications comprised within the scope defined by the following claims can be introduced in the preferred embodiments which have just been described.

The invention claimed is:

1. A configuration of engines (3) for aircraft located in a rear part of a fuselage (2) of said aircraft, the engines (3) being attached in a fixed manner by suspension pylons (5) to a structure of the aircraft, said structure comprising a torsion box (14) which traverses the fuselage (2) and is used to attach the suspension pylons (5), wherein said fuselage (2) comprises an opening (4) allowing passage of the suspension pylons (5) for the engines (3), said configuration further comprising a pivoting area (8), an actuator (7), and a fitting (6) through which the actuator (7) is attached to the suspension pylons (5) and to the torsion box (14) of said aircraft, such that an assembly formed by the actuator (7) and the fitting (6) allow balancing of the suspension pylon (5) and the engine (3) assembly of the aircraft through the pivoting area (8), thereby achieving controllable and optimal thrust vectoring of said aircraft for each flight phase.

2. The configuration of engines (3) for aircraft according to claim 1, wherein the pivoting area (8) comprises first symmetrical fittings (11) attached in a fixed manner to the torsion box (14) of said aircraft, and second symmetrical fittings (12) attached in a fixed manner to a frame (9) of the aircraft, a coupling of the first and second fittings (11, 12) giving rise to a pivoting shaft (10).

3. The configuration of engines (3) for aircraft according to claim 1, wherein the actuator (7) is located on the perpendicular of the longitudinal axis of said aircraft.

4. The configuration of engines (3) for aircraft according to claim 3, wherein the torsion box (14) is located in a plane horizontal to the perpendicular of the longitudinal axis of the aircraft, attached to a frame (9) through first and second fittings (11, 12) giving rise to the pivoting area (8) such that a thrust component of said aircraft angularly diverts within planes parallel to the vertical of said aircraft.

5. The configuration of engines (3) for aircraft according to claim 3, wherein the torsion box (14) is located in a plane parallel to the perpendicular of the longitudinal axis of said aircraft, attached to a frame (9) through the first and second fittings (11, 12) giving rise to the pivoting area (8) such that a thrust component of said aircraft angularly diverts within planes parallel to the vertical of said aircraft.

6. The configuration of engines (3) for aircraft according to claim 1, wherein the actuator (7) is a worm gear-type actuator.

7. The configuration of engines (3) for aircraft according to claim 1, wherein the suspension pylons (5), which have a fixed attachment to the engines (3) of said aircraft, are attached to one another through the structure formed by its frames (13) and the torsion box (14) such that all these elements together form a rigid solid.

* * * * *